United States Patent [19]

Belknap

[11] Patent Number: 4,818,155

[45] Date of Patent: Apr. 4, 1989

[54] POWER TOOL SYSTEM INCLUDING ADAPTER AND COUPLING MEMBER THEREFOR

[75] Inventor: John C. Belknap, Buffalo, N.Y.

[73] Assignee: MacMuscle Co., Inc., Buffalo, N.Y.

[21] Appl. No.: 152,247

[22] Filed: Feb. 4, 1988

[51] Int. Cl.[4] ........................ B23B 45/14; E21C 11/00

[52] U.S. Cl. ........................................ 408/130; 173/36; 175/320; 248/565; 248/615; 248/674; 408/710; 408/714

[58] Field of Search ............... 408/127, 712, 714, 716, 408/130, 131; 173/34, 36; 175/300, 320; 248/565, 615, 622, 623, 624, 625, 674; 464/51, 77

[56] References Cited

U.S. PATENT DOCUMENTS

| | | | |
|---|---|---|---|
| 1,988,295 | 1/1935 | Berry | 248/615 X |
| 2,381,102 | 8/1945 | Boyd | 408/127 X |
| 2,405,110 | 8/1946 | Bullock | 173/36 X |
| 2,643,088 | 6/1953 | Hornack | 173/36 X |
| 2,722,812 | 11/1955 | Golasky | 408/127 X |
| 2,917,953 | 12/1959 | Badali | 173/36 X |
| 3,999,776 | 12/1976 | Betts, Sr. | 248/624 X |
| 4,724,279 | 2/1988 | Ayscue | 248/623 X |
| 4,736,804 | 4/1988 | Geibel | 173/36 X |

FOREIGN PATENT DOCUMENTS

| | | | |
|---|---|---|---|
| 0143047 | 7/1980 | German Democratic Rep. | 408/712 |

*Primary Examiner*—Z. R. Bilinsky

*Attorney, Agent, or Firm*—Joseph P. Gastel

[57] ABSTRACT

A power tool combination including a hammer drill, an adapter secured to the drill for attaching it to an elongated rod which bears on the floor, a pneumatic cylinder and piston unit mounted between the elongated rod and the drill for applying an uniform external force for moving the power drill into the ceiling, and a coupling member between the pneumatic piston and cylinder unit. The coupling member is rigid for transmitting axial forces therethrough under normal operating conditions but is capable of yielding to absorb abrupt shock forces in the event that the drill encounters an undesirable obstruction in the ceiling, the coupling member including structure for causing it to return to a normal rigid condition after the shock forces have been absorbed.

33 Claims, 1 Drawing Sheet

POWER TOOL SYSTEM INCLUDING ADAPTER AND COUPLING MEMBER THEREFOR

BACKGROUND OF THE INVENTION

The present invention relates to a an improved system for drilling holes in ceilings.

By way of background, in my copending application Ser. No. 107,650, filed Oct. 13, 1987, a system is shown for drilling holes in ceilings by use of a hammer drill mounted on an elongated rod which bears on the floor. In this system a pneumatic cylinder supplies the force for supporting the hammer drill and also feeding it into the ceiling with a constant force. This structure was developed so that the drill operator did not have to support the drill which weighed approximately fifteen pounds. However, it has been found that the drill could be jerked out of position if it was subjected to shock loading when the drill bit struck embedded reinforcing rods in concrete ceilings.

SUMMARY OF THE INVENTION

It is accordingly one object of the present invention to provide an improved coupling member for installation between a power tool supporting structure and the power tool itself which will provide a rigid connection therebetween to permit external operating forces to be applied through the coupling member during normal operation but which can yield to absorb abrupt shock loading forces.

Another object of the present invention is to provide a power tool and adapter combination for mounting the power tool on an external force-applying member.

A further object of the present invention is to provide a combination of a power tool and a coupling member for coupling the power tool to an external force-applying member so as to permit the force produced by the external force-applying member to be transmitted directly to the power tool but which will yield when abrupt shock forces are experienced by the power tool. Other objects and attendant advantages of the present invention will readily be perceived hereafter.

The present invention relates to a coupling member comprising first and second body members, first and second attachment means on said first and second body members, respectively, for attachment to first and second external objects, respectively, and resilient coupling means for coupling said first and second body members in a first position for providing sufficient axial rigidity therebetween to permit axial forces to be transmitted between said first and second external members through said first and second body members in a predetermined direction but permitting radial flexing between said first and second body members to a second position when they are subjected to radial forces above a predetermined value and thereafter returning said body members to said first position after said radial forces are removed.

The present invention also relates to a power tool and adapter combination for attaching said power tool to an external force-applying member comprising a power tool, a casing on said power tool, a plate having a main body section and a flange extending at an angle to said main body section, bolt means attaching said main body section to said casing, cement means forming a bridge between said flange and said casing, and attachment means on said flange for securing said power tool to said external force-applying member.

The present invention also relates to the combination of a power tool and a coupling member for coupling said power tool to an external force-applying member, the combination including: first attachment means on said power tool, said coupling member comprising first and second body members, second attachment means on said first body member for attachment to said first attachment means, third attachment means on said second body member for attachment to said external force-applying member, and resilient coupling means for coupling said first and second body members in a first position for providing sufficient axial rigidity therbetween to permit axial forces to be transmitted between said external force-applying member and said power tool through said first and second body members in a predetermined direction but permitting radial flexing between said first and second body members to a second position when they are subjected to radial forces above a predetermined value and thereafter returning said body members to said first position after said radial forces are removed.

The present invention will be more fully understood when the following portions of the specification are read in conjunction with the accompanying drawings wherein:

BRIEF DESCRIPTION OF THE DRAWINGS

FIG. 6 is a fragmentary cross sectional view taken substantially along line 6—6 of FIG. 1 and showing the bridge between the handle of the power tool and the adapter plate;

FIG. 7 is an enlarged fragmentary cross sectional view taken substantially along line 7—7 of FIG. 1 and showing the locking connection between the telescoping portions of the elongated rod;

FIG. 8 is a fragmentary side elevational view of a modified form of power tool construction which does not require the adapter plate of FIG. 1; and FIG. 9 is a view taken substantially in the direction of arrows 9—9 of FIG. 8.

DESCRIPTION OF THE PREFERRED EMBODIMENTS

Figure 1:
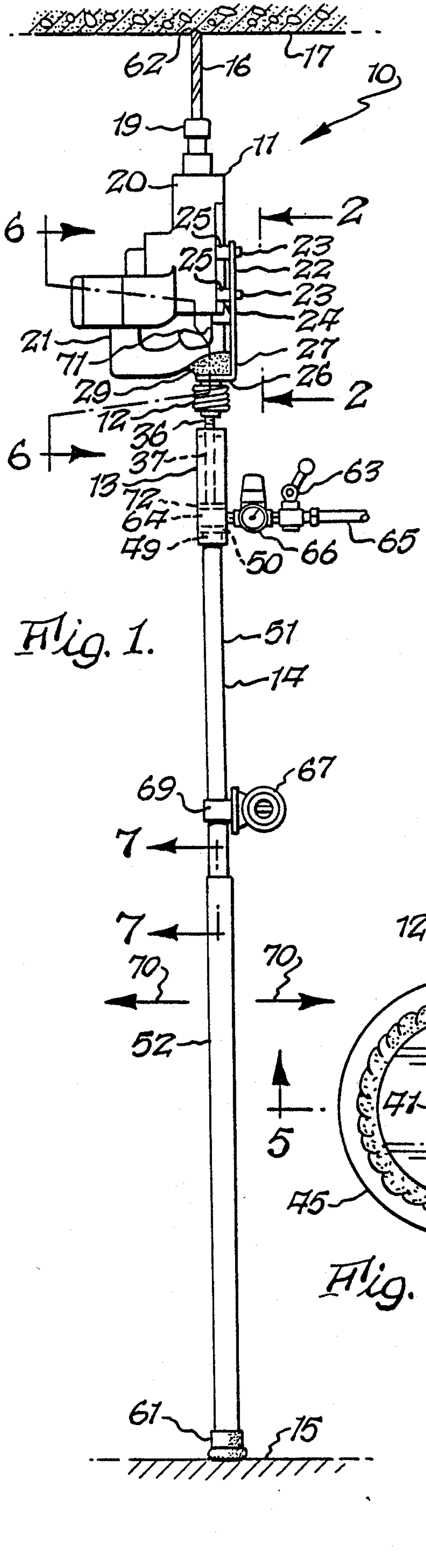
FIG. 1 is a side elevational view of the improved power tool system of the present invention.
Figure 2:
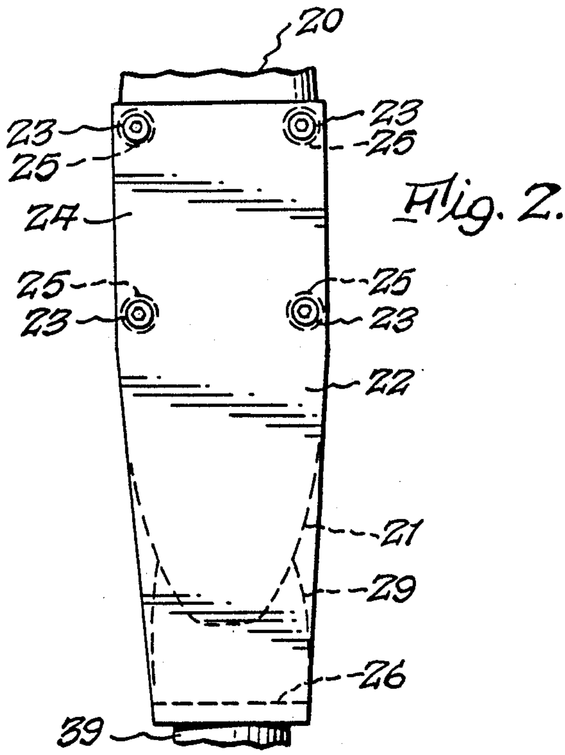
FIG. 2 is an enlarged fragmentary view taken substantially in the direction of arrows 2—2 of FIG. 1.

The improved power tool system 10 of the present invention includes a hammer drill 11 which is supported by a rigid but flexible coupling 12 on pneumatic cylinder 13 which in turn is supported on telescopic rod 14 which bears on a floor surface 15. When compressed air is supplied to pneumatic cylinder 13, the drill bit 16 will be driven into concrete ceiling 17. The hammer drill 11 includes a chuck 19 which drives drill bit 16. Hammer drill 11 also includes a casing 20 of which handle 21 is a part.

In accordance with the present invention, an adapter plate 22 is securely fastened to the casing 20 and handle 21. In this respect, a plurality of screws 23 have heads which bear on main portion 24 of the adapter plate and have shanks which extend through sleeves 25 located between the main plate portion 24 and the top surface of casing 20. Ordinarily, the hammer drill 11 has shorter screws which enter casing 20 in the same positions now occupied by screws 23. Thus, the removal of the original screws has been effected and longer screws 23 have been substituted therefor with spacer sleeves 25 therebetween. A flange 26 extends at a right angle to main plate portion 24. The space between flange 26 and the adjacent portion 27 of plate portion 24 and the portion of handle 21 is filled in with a bridge 29 of epoxy cement. The adapter plate flange 26 is tapped at 30 (FIG. 6), and the shank 31 of a hex head bolt 32 is threaded through tapped bore 30 with a lock washer 33 located between the hexagonal head and surface 34 of flange 26. Thus, shank 31 will project beyond flange surface 35 to provide a threaded stud.

Figure 5:
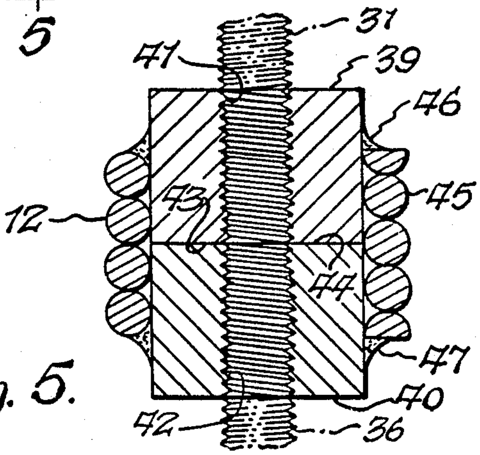
FIG. 5 is a cross sectional view taken substantially along line 5—5 of FIG. 4.

A coupling member 12 is internally threded at 41 for receiving stud 31. Coupling member 12 is installed between stud 31 and the threaded end 36 of piston rod 37 of pneumatic cylinder unit 13 to provide a rigid but yet flexible connection therebetween, as explained in greater detail hereafter. More specifically, coupling member 12 includes adjacent body members 39 and 40 in the form of cylindrical blocks having tapped portions 41 and 42, respectively, for receiving threaded members 31 and 36, respectively. Body members 39 and 40 have annular planar surfaces 43 and 44, respectively, which are in contiguous abutting relationship. They are held in this position by a heavy helical spring 45 which has internal surfaces in engagement with the external surfaces of body members 39 and 40 (FIG. 5). One end of helical spring member 45 is welded to body member 39 by annular weld 46 and the opposite end of spring 45 is welded to body member 40 by annular weld 47. Thus when an axial force coincident with the longitudinal axis of bores 41 and 42 is applied to coupling member 12, this force will be transmitted in an axial direction through the coupling member. Furthermore, as can be seen from FIG. 1, the longitudinal axes of bores 41 and 42 are substantially in alignment with the longitudinal axis of drill bit 16.

An extendible telescopic elongated rod 14 has an upper end portion 49 which is telescopically and removably received in frictional engagement in a tubular end portion 50 of cylinder unit 13. Rod 14 includes an upper portion 51 and a lower portion 52 which telescopically receives it. Tubular members 51 and 52 are locked in an adjusted position relative to each other by the structure shown in FIG. 7. In this respect, a block 53 is securely held within end portion 54 of tubular member 51. A cylindrical elastomeric block 55 is secured to block 53 by elongation pin 56 which is eccentric to both blocks 53 and 55. Washers 57 and 59 are located as shown so as to permit swiveling action of block 55 on pin 56. Thus when tubular members 51 and 52 are rotated relative to each other, elastomeric block 55 will be forced into tight frictional engagement with the inner surface 60 of tubular member 52 to thus hold the tubular members in any adjusted position. To loosen them, the reverse action is performed. An elastomeric cap 61 is mounted at the lower end of tubular member 52 and bears against floor 15.

The above-described structure is used to drill holes in ceiling 17 which may be concrete or any other hard material. To this end, the tip of drill bit 16 is positioned at the location 62 at which a perfectly vertical hole is to be drilled into ceiling 17. The rod 14 is then extended so that tip 61 bears lightly on the floor. Valve 63 is then actuated to cause compressed air to flow into chamber 64 of cylinder 13 from a compressed air source, not shown, through conduit 65 and pressure regulator valve 66. The valve 63, which is a three-way valve, is then closed. This will apply force to piston rod 37 to set the unit 10 in an approximate self-supporting position between the floor and the ceiling. Thereafter, a bubble gauge 67, which is removably clipped onto removable member 51 by plastic arms 69, is observed as rod 14 is pivoted about the tip of the drill bit in the direction of arrows 70 until the bubble level 67 shows rod 14 to be vertical in the plane of the drawing, and thereafter the bubble level is moved 90° to the plane of the drawing, and rod 14 is pivoted about the tip of the drill bit in a direction perpendicular to the plane of the drawing until the bubble level shows rod 14 to be vertical in this position. The foregoing procedure is followed until rod 14 is perfectly vertical.

Figure 3:
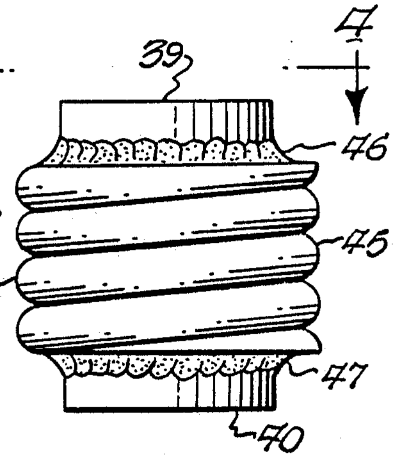
FIG. 3 is an enlarged side elevational view of the coupling member shown in FIG. 1.
Figure 4:
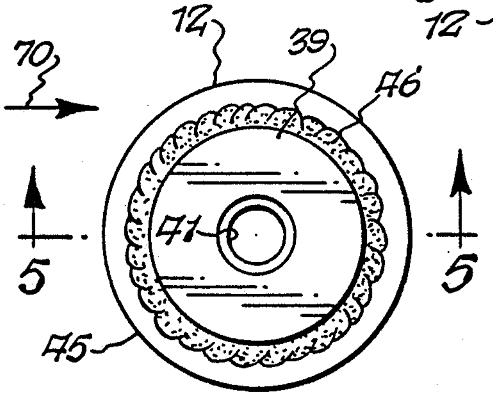
FIG. 4 is a view of the coupling member taken substantially in the direction of arrows 4—4 of FIG. 3.

After the foregoing setup has been achieved, valve 63 is opened and the trigger 71 of the drill is actuated to energize the hammer drill 20 from a suitable source of electric power not shown. Valve 63 is either open to supply compressed air to cylinder 13 or is closed to shut off the air supply or is vented to vent cylinder 13. Since compressed air is being supplied to chamber 64 of cylinder unit 13, piston 72, at the end of piston rod 37, will force to drill 11 upwardly while it is being energized to thus drill a perfectly vertical hole in ceiling 17. During this drilling action, coupling member 12 will transmit force from piston rod 37 in a perfectly axial direction, as is desired, because the hole is to be perfectly vertical. In other words, during normal operation coupling member 12 is perfectly rigid and will not in any way deflect. However, as mentioned above, concrete ceilings have steel reinforcing bars or rods or screens therein. If the drill bit 16 should hit one of these, there is the possibility that a very abrupt shock will be transmitted to the drill 11, and this shock may be sufficiently severe to cause damage to either the drill or any of the other structure associated with the unit or to throw the drill 11 laterally. Accordingly, under these conditions the helical spring 45, being resilient, will permit body members 39 and 40 to move relative to each other, and thus the spring will absorb the shock of impact. When the shock has been removed, spring 45 will return body members 39 and 40 to their normal position shown in FIGS. 3–5.

The pressure regulator 66 causes the piston and cylinder unit 13 to move drill 11 toward ceiling 17 with an uniform force. After the drlling has been completed, the drill bit 16 is withdrawn from the hole, and this is achieved by actuating valve 63 to vent chamber 64. After drill bit 16 has been withdrawn, the foregoing process can be repeated at additional sites at which holes are to be drilled.

It can readily be seen that the adapter plate 22 is secured to drill casing 20 in an extremely strong manner so that even if the drill is subjected to high impact loadings, there cannot be separation of the two. In addition, the coupling member 12 provides an extremely rigid connection to the drill in an axial direction but it will absorb radial shock forces above a predetermined value to thereby safeguard the equipment against damage, and after the shock force no longer exists, coupling member 39 will return to its original position.

In FIGS. 8 and 9 a modified embodiment of the present invention is disclosed which does not require the adapter plate construction 22 of the preceding figures. The drill 74 includes a handle 75 of plastic which has an attachment member 76 molded therein. Attachment member 76 includes two spaced cylindrical portions 77 and 79 connected by a central cylindrical portion 80 of smaller diameter. The plastic of handle 75 is molded around the foregoing unit. A stud 31', which is analogous to stud 31 of the preceding figures, is formed integrally with member 76 for receiving the coupling member 12 of the preceding drawings.

While the coupling member 12 has been shown with two tapped bores therein, it will readily be appreciated that one of these can have a stud substituted therefor for mating engagement with a tapped aperture associated with the drill. In this event, a tapped aperture could be provided in flange 26 of FIGS. 1-7 or a tapped aperture could be substituted for stud 31' of FIG. 8.

While preferred embodiments of the present invention have been disclosed, it will be appreciated that the present invention is not limited thereto, but may be otherwise embodied within the scope of the following claims.

What is claimed is:

1. A coupling member comprising first and second body members, first and second attachment means on said first and second body members, respectively, for attachment to first and second external objects, respectively, and resilient coupling means for coupling said first and secnd body members in a first position for providing sufficient axial rigidity therebetween to permit axial forces to be transmitted between said first and second external members through said first and second body members in a predetermined direction but permitting radial flexing between said first and second body members to a second position when they are subjected to radial forces above a predetermined value and thereafter returning said body members to said first position after said radial forces are removed, said first and second body members comprising first and second blocks, respectively, and said resilient coupling means comprising spring means joining said blocks, and said first and second blocks having contiguous abutting faces.

2. A coupling member as set forth in claim 1 wherein said spring means comprises a helical spring located in encircling engagement to said first and second blocks.

3. A coupling member as set forth in claim 2 wherein said first and second blocks have first and second outer surfaces, respectively, and wherein said helical spring has an inner surfce in contiguous abutting relationship with said first and second outer surfaces.

4. A coupling member as set forth in claim 3 wherein said spring has first and second ends, and first and second welds connecting said first and second ends to said first and second blocks, respectively.

5. A coupling member as set forth in claim 1 wherein said first and second attachment means comprise first and second tapped bores in said first and second blocks, respectively.

6. A coupling member as set forth in claim 5 wherein said first and second tapped bores are in axial alignment.

7. A power tool and adapter combination for attaching said power tool to an external force-applying member comprising a power tool, a casing on said power tool, a plate having a main body section and a flange extending at an angle to said main body section, bolt means attaching said main body section to said casing, cement means forming a bridge between said flange and said casing, and attachment means on said flange for securing said power tool to said external force-applying member.

8. A power tool and adapter combination as set forth in claim 7 wherein said casing includes a handle of said power tool, and wherein said bridge is located between said flange and said handle.

9. A power tool and adapter combination as set forth in claim 7 wherein said power tool is a drill, means on said casing for mounting a drill bit having a longitudinal axis, and said attachment means being substantially in alignment with said longitudinal axis.

10. A power tool and adapter combination as set forth in claim 9 wherein said attachment means comprises a threaded stud.

11. A power tool and adapter combination as set forth in claim 9 wherein said casing includes a handle of said power tool, and wherein said bridge is located between said flange and said handle.

12. A power tool and adapter combination as set forth in claim 7 including a coupling member for coupling said power tool to said external force-applying member comprising first and second body members, second and third attachment means on said first and second body members, respectively, said second attachment means being attachable to said attachment means on said flange and said third attachment means being attachable to said external force-applying member, and resilient coupling means coupling said first and second body members in a first position for providing sufficient axial rigidity therebetween to permit axial forces to be transmitted from said force-applying member to said power tool through said first and second body members in a predetermined direction but permitting radial flexing between said first and second body members to a second position when they are subjected to radial forces above a predetermined value and thereafter returning said body members to said first position after said radial forces are removed.

13. A power tool and adapter combination as set forth in claim 12 wherein said first and second body members comprise first and second blocks, respectively, and wherein said resilient couping means comprises spring means joining said blocks.

14. A power tool and adapter combination as set forth in claim 13 wherein said first and second blocks have contiguous abutting faces.

15. A power tool and adapter combination as set forth in claim 14 wherein said spring means comprises a helical spring located in encircling engagement to said first and second blocks.

16. A power tool and adapter combination as set forth in claim 15 wherein said first and second blocks have first and second outer surfaces, respectively, and wherein said helical spring has an inner surface in contiguous abutting relationship with said first and second outer surfaces.

17. A power tool and adapter combination as set forth in claim 16 wherein said spring has first and second ends, and first and second welds connecting said first and second ends to said first and second blocks, respectively.

18. A power tool and adapter combination as set forth in claim 12 wherein said power tool is a drill, means on said casing for mounting a drill bit having a longitudinal axis, and said attachment means being substantially in alignment with said longitudinal axis.

19. A power tool and adapter combination as set forth in claim 18 in combination with an elongated rod having a second longitudinal axis, said elongated rod comprising said external force-applying member, and said longitudinal axis of said drill bit and said second longitudinal axis being in substantial alignment.

20. A power tool and adapter combination as set forth in claim 19 including motor means effectively coupled to said elongated rod to apply force to said coupling means.

21. A power tool and adapter combination as set forth in claim 20 wherein said motor means comprises a piston and cylinder unit coupled btween said elongated rod and said coupling means.

22. A power tool and adapter combination as set forth in claim 19 wherein said first and second body members comprise first and second blocks, respectively, and wherein said resilient couping means comprises spring means joining said blocks.

23. A power tool and adapter combination as set forth in claim 22 wherein said first and second blocks have contiguous abutting faces.

24. A power tool and adapter combination as set forth in claim 23 wherein said spring means comprises a helical spring located in encircling engagement to said first and second blocks.

25. A power tool and adapter combination as set forth in claim 24 wherein said first and second blocks have first and second outer surfaces, respectively, and wherein said helical spring has an inner surface in contiguous abutting relationship with said first and second outer surfaces.

26. A power tool and adapter combination as set forth in claim 25 wherein said spring has first and second ends, and first and second welds connecting said first and second ends to said first and second blocks, respectively.

27. In combination: a power tool and a coupling member for coupling said power tool to an external force-applying member, first attachment means on said power tool, said coupling member comprising first and second body members, second attachment means on said first body member for attachment to said first attachment means, third attachment means on said second body member for attachment to said external force-applying member, and resilient coupling means for coupling said first and second body members in a first position for providing sufficient axial rigidity therebetween to permit axial forces to be transmitted between said external force-applying member and said power tool through said first and second body members in a predetermined direction but permitting radial flexing between said first and second body members to a second position when they are subjected to radial forces above a predetermined value and thereafter returning said body members to said first position after said radial forces are removed.

28. In combination: a power tool and a coupling member as set forth in claim 27 wherein said first and second body members comprise first and second blocks, respectively, and wherein said resilient couping means comprises spring means joining said blocks.

29. In combination: a power tool and a coupling member as set forth in claim 28 wherein said first and second blocks have contiguous abutting faces.

30. In combination: a power tool and a coupling member as set forth in claim 29 wherein said spring means comprises a helical spring located in encircling engagement to said first and second blocks.

31. In combination: a power tool and a coupling member as set forth in claim 30 wherein said first and second blocks have first and second outer surfaces, respectively, and wherein said helical spring has an inner surface in contiguous abutting relationship with said first and second outer surfaces.

32. In combination: a power tool and a coupling member as set forth in claim 31 wherein said spring has first and second ends, and first and second welds connecting said first and second ends to said first and second blocks, respectively.

33. In combination: a power tool and a coupling member as set forth in claim 27 wherein said power tool is a drill, means on said drill for mounting a drill bit having a first longitudinal axis, and said coupling member having a second longitudinal axis in substantial alignment with said first longitudinal axis.

* * * * *